United States Patent
Turner et al.

(10) Patent No.: US 9,306,198 B2
(45) Date of Patent: *Apr. 5, 2016

(54) POWER TOOL WITH BATTERY PACK EJECTOR

(71) Applicant: Black & Decker Inc., Newark, DE (US)

(72) Inventors: Terry L. Turner, Oakland, MD (US); David C. Campbell, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/951,120

(22) Filed: Jul. 25, 2013

(65) Prior Publication Data
US 2014/0014386 A1    Jan. 16, 2014

Related U.S. Application Data

(63) Continuation of application No. 13/617,081, filed on Sep. 14, 2012, now Pat. No. 8,573,324, which is a continuation of application No. 12/544,330, filed on Aug. 20, 2009, now Pat. No. 8,312,937, which is a continuation of application No. 10/827,465, filed on Apr. 19, 2004, now Pat. No. 8,181,717, which is a continuation of application No. 10/652,915, filed on Aug. 29, 2003, now Pat. No. 7,661,486, which is a continuation of application No. 09/938,202, filed on Aug. 24, 2001, now Pat. No. 6,729,413.

(51) Int. Cl.
*E21B 4/12* (2006.01)
*H01M 2/10* (2006.01)

(52) U.S. Cl.
CPC ........ *H01M 2/1022* (2013.01); *Y10T 29/49826* (2015.01); *Y10T 403/595* (2015.01)

(58) Field of Classification Search
CPC .................................. E21B 4/12; H01M 2/10
USPC .............. 173/104, 117, 216, 217; 310/47, 50; 429/97, 99, 100, 123; 439/513, 700
See application file for complete search history.

(56) References Cited

U.S. PATENT DOCUMENTS

| | | | |
|---|---|---|---|
| 6,729,413 B2 * | 5/2004 | Turner et al. ................... | 173/217 |
| 7,661,486 B2 * | 2/2010 | Turner et al. ................... | 173/217 |
| 8,181,717 B2 * | 5/2012 | Turner et al. ................... | 173/217 |

* cited by examiner

*Primary Examiner* — Nathaniel Chukwurah
(74) *Attorney, Agent, or Firm* — Michael J. Aronoff

(57) ABSTRACT

A power tool has a mechanism for forcing a battery pack at least partially from a cavity that receives a battery pack. A biasing member is in the cavity. A member for retaining the biasing member is also in the cavity. The biasing member forces the battery pack at least partially from the cavity. When the battery pack is locked onto the frame, the biasing member is in a compressed condition and when the battery pack is an unlocked position, the biasing member forces the battery pack at least partially from the frame.

2 Claims, 3 Drawing Sheets

POWER TOOL WITH BATTERY PACK EJECTOR

CROSS REFERENCE TO RELATED APPLICATIONS

This is a continuation of U.S. Ser. No. 13/617,081, filed Sep. 14, 2012, which is a continuation of U.S. Ser. No. 12/544,330, filed Aug. 20, 2009 (now U.S. Pat. No. 8,312,937), which is a continuation of U.S. Ser. No. 10/827,465, filed Apr. 19, 2004 (now U.S. Pat. No. 8,181,717), which is a continuation of U.S. Ser. No. 10/652,915, filed Aug. 29, 2003 (now U.S. Pat. No. 7,661,486), which is a continuation of U.S. Ser. No. 09/938,202 filed Aug. 24, 2001 (now U.S. Pat. No. 6,729,413). The disclosures of the above applications are incorporated by reference.

FIELD AND BACKGROUND OF THE INVENTION

The present invention relates to power tools and, more particularly, to battery operated power tools which include a mechanism for ejecting the battery from the tool.

In the power tool field, as battery technology improves, tradesmen are turning to battery operated tools. As the tradesmen utilize the battery operated tools, they desire tools with increased power, extended battery life, and longer durability. However, as tradesmen require more power and extended battery life, battery size and weight increase. As this occurs, it is desirable to have additional help to eject the batteries from the power tools.

Various types of battery ejectors exist in the field. Ordinarily, the batteries are surrounded by the housing and the biasing mechanism applies a force on the battery or battery pack near the electrical contact area. This is illustrated in U.S. Pat. No. 4,146,682 to Nakao; U.S. Pat. No. 5,681,667 to Bunyea et al; U.S. Pat. No. 5,225,293 to Mitchell et al; and U.S. Pat. No. 5,637,417 to Engmark et al.

U.S. Pat. No. 6,223,835 to Habedank et al, which is assigned to the assignee of the present invention, discloses a mechanism for assisting an ejecting battery from a power tool. The mechanism includes a cap which is biased by a spring or springs which are positioned within the housing. The cap acts upon the battery to apply a removal force onto the battery. Here, the top of the battery and the end of the battery are surrounded by the power tool housing.

The cited art does not provide a solution for ejecting a battery which is freely suspended by its coupling mechanism. In this case, the battery is supported on only one side and the remaining battery extends from the housing of the power tool. The majority of battery ejectors for these types of batteries are like those illustrated in U.S. Pat. No. 5,213,913. Here, the latching mechanisms, when moved, allow gravity to drop the battery from the housing. Thus, there was no need for a biasing force to remove the battery pack from the tool housing.

SUMMARY OF THE INVENTION

The present invention provides the art with a battery ejection mechanism which is utilized on batteries which are suspended from the power tool. The suspended battery includes rails which enable the battery to slide onto the power tool. The biasing member is positioned adjacent to the battery rails for ejecting the battery. Also, the biasing member is positioned in alignment such that the biasing member contacts the face of the rail mechanism of the battery to eject the battery. The battery is partly ejected from the tool housing so that it can be removed from the housing.

In accordance with a first aspect of the present invention, a mechanism for ejecting a battery comprises a frame with a cavity in the frame to receive a battery pack. A receiving member extends from the frame and is adjacent the cavity. The receiving member meshes with a member on the battery pack to maintain the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel.

In accordance with a second aspect of the invention, a power tool comprises a housing with a motor in the housing. An output is coupled with the motor. An activation member is included to activate the motor. A mechanism on the housing receives a battery pack. The mechanism includes a frame, with a receiving member and an adjacent cavity. The receiving member meshes with a member on the battery pack to hold the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel. A battery pack is received in the battery pack receiving mechanism. The battery pack includes a pair of rails mating in the channels. The battery pack rails include an upper portion and a lower portion and a channel between the upper and lower portions. The extending tabs extend into the channel of the battery pack rails. The battery pack rails include end faces that abut the helical springs. The battery rails slide in the channels and the frame rails freely suspend the battery pack from the tool housing. The helical springs are positioned in the tool electrical connector housing.

From the following detailed description, taken in conjunction with the drawings and subjoined claims, other objects and advantages of the present invention will become apparent to those skilled in the art.

DETAILED DESCRIPTION OF THE PREFERRED EMBODIMENTS

Figure 1:
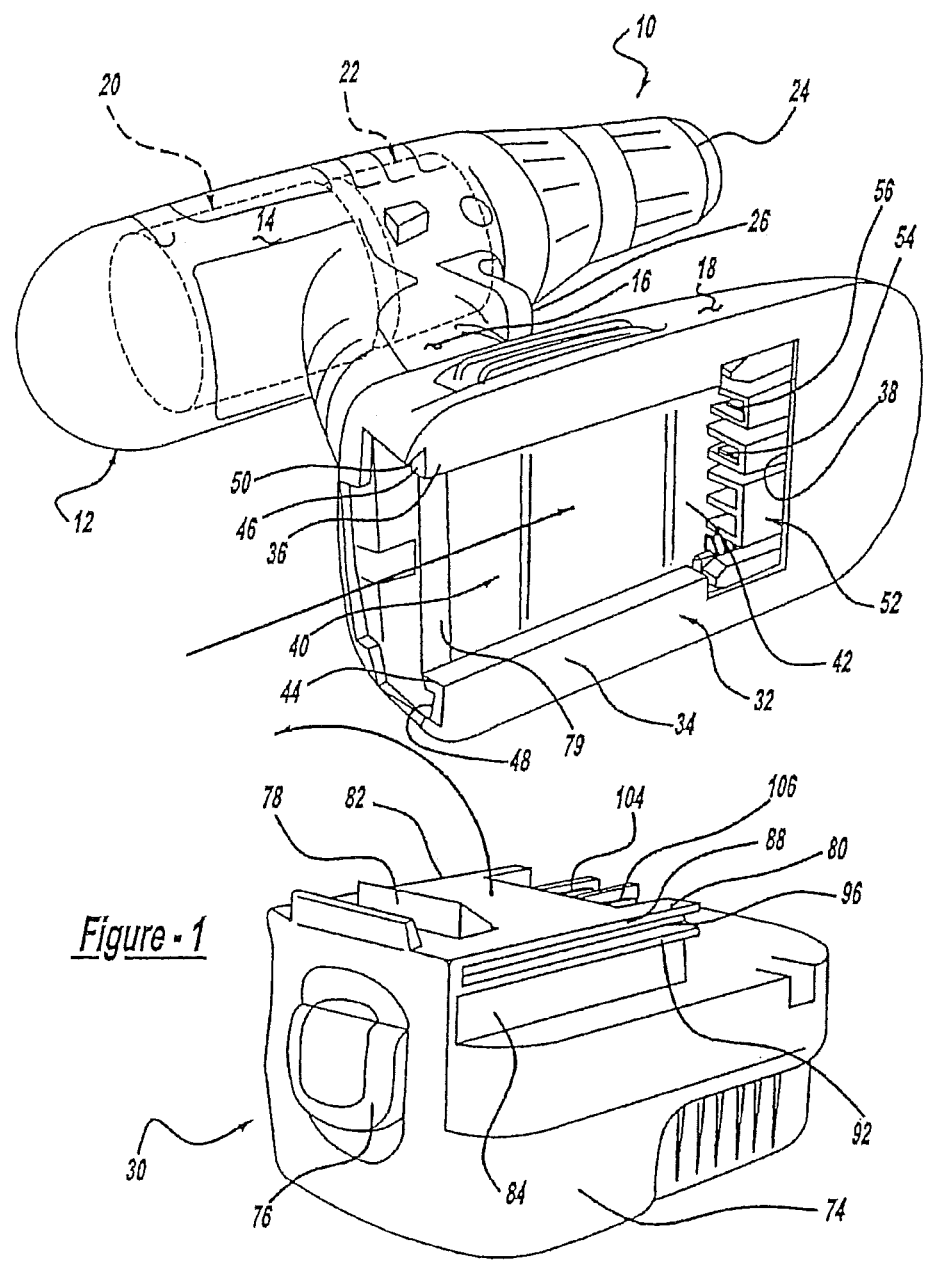
FIG. 1 is a bottom perspective view of a power tool in accordance with the present invention.
Figure 2:
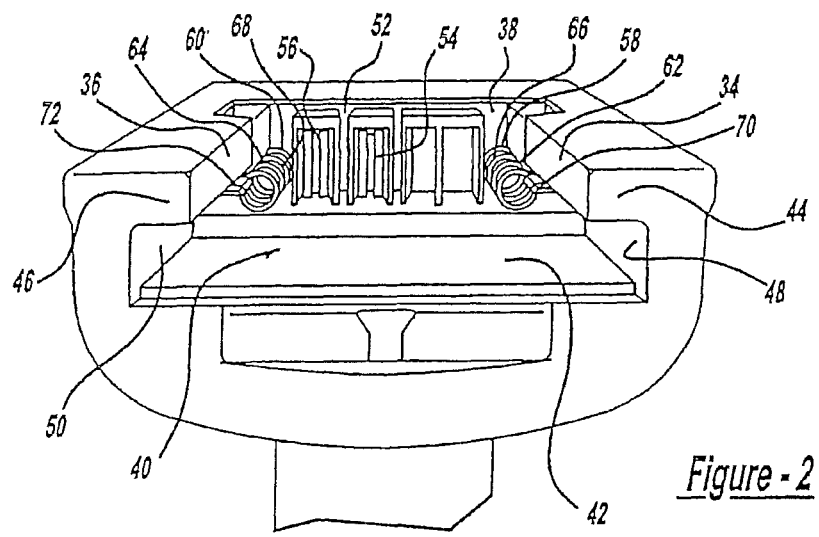
FIG. 2 is a side perspective view of the battery receiving mechanism of the drill of FIG. 1.

Turning to the figures, particularly FIG. 1, a power tool is illustrated and designated with the reference numeral 10. The power tool 10 includes a housing 12 which includes a motor portion 14 and a handle portion 16 as well as a base portion 18. A motor 20 is positioned in the housing 12. An output 22 is coupled with the motor 20 and in this case includes a chuck 24. An activation member 26 is positioned on the handle portion. The activation member is electrically coupled with the motor 20 as well as with a battery pack 30 which supplies the power to the power tool 10.

The housing base portion 18 includes a battery pack receiving frame 32. The battery pack receiving frame 32 includes a pair of opposing side walls 34 and 36 as well as an end wall 38. The side walls 34, 36 and end wall 38 define a battery receiving cavity 40. The cavity 40 is limited on the frame by a top wall or base 42. Each side wall 34, 36 includes a rail 44, 46. The rails 44, 46 extend longitudinally along the frame from an end of the housing base portion 18 towards the end wall 38. Channels 48, 50 are formed between the rails 44, 46 and the top wall 42. The channels 48, 50 receive the battery pack 30.

Figure 3:
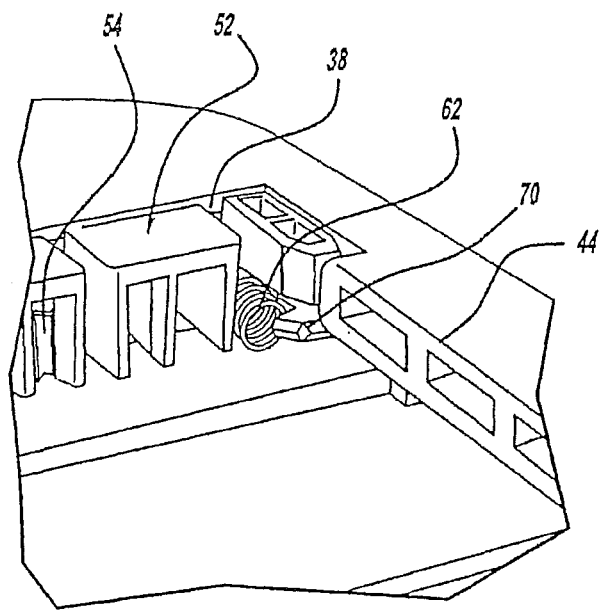
FIG. 3 is an enlarged perspective view of a portion of the receiving element of FIG. 2.
Figure 4:
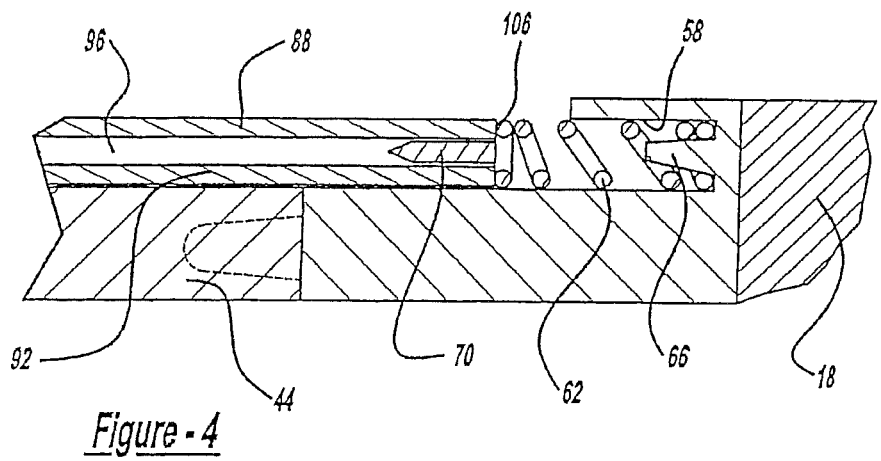
FIG. 4 is a cross-section view of FIG. 1.
Figure 5:
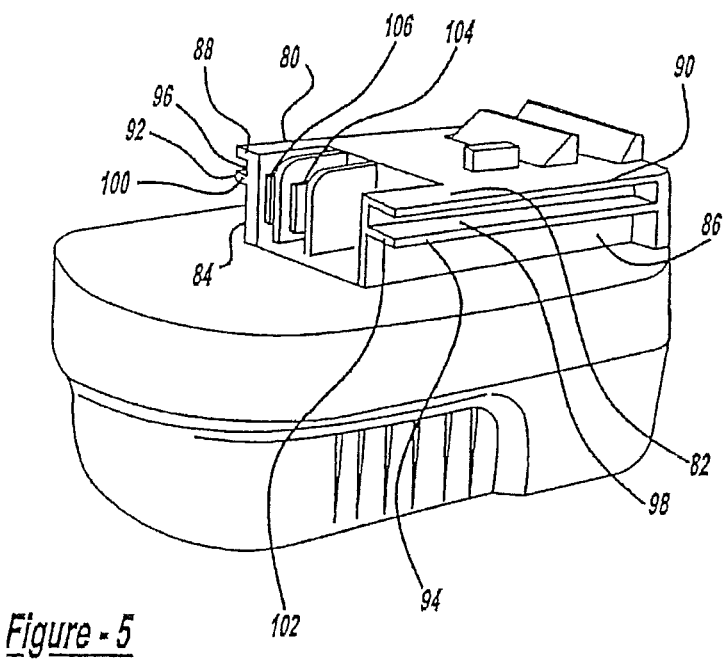
FIG. 5 is a perspective view of the battery removed from the tool.

An electrical connector housing 52 is coupled with the housing base portion 18 adjacent the end wall 38. The electrical connector housing 52 includes electrical connectors 54, 56 which couple with electrical connectors of the battery pack 30. The electrical connector housing 52 includes bores 58, 60 which receive helical springs 62, 64. Spring guides 66, 68 are positioned at the bottom of the bores 58, 60 to guide the helical springs 62, 64. Also, the guides 66, 68 maintain the springs in the bores 58, 60 during assembly. Tabs 70, 72 extend from the side walls 34, 36 of the receiving frame 32. The tabs 70, 72 capture the helical springs 62, 64 to maintain the springs 62, 64 in the bores 58, 60. The tabs 70, 72 are positioned between the rails and the top wall 42 aligned with the channels 48, 50 as seen in FIG. 3. The tabs 70, 72 are tapered from the frame 32 to the free end. Also, the tabs 70, 72 are tapered along their thickness as seen in FIGS. 3 and 4. The tapers assist in guiding the battery pack 30.

The battery pack 30 includes a housing 74 with a plurality of batteries (not shown) positioned within the housing. A release button 76 which is coupled with a latch 78 is positioned on the housing 74. The latch 78 secures the battery pack 30 to the top wall 42 of the housing base portion 18. The battery housing 74 includes rails 80, 82 longitudinally extending along the top surface of the battery pack 30. The rails define channels 84, 86 which mesh with the rails 44, 46 of the housing base portion 18. The rails 80, 82 include upper surfaces 88, 90 and lower surfaces 92, 94. The upper and lower surfaces define channels 96, 98. The rails 80, 82 are received in the channels 48, 50 of the housing base receiving frame 32. The battery pack 30 includes electrical connectors 104, 106. The electrical connectors 104, 106 are received in the electrical connectors 54, 56 for powering the power tool 10.

The battery pack 30 is coupled with the housing receiving frame 32 as follows. The battery pack rails 80, 82 are positioned in the frame channels 48, 50. The battery pack 30 is slid, rail upon rail, into the receiving frame 32 until the latch 78 secures in a catch 79 in the top wall 42. As this occurs, the battery rail faces 100, 102 abut the helical springs 62, 64. Prior to this happening, the battery rail channels 96, 98 receive the extending tabs 70, 72. The tabs 70, 72 guide the rails 80, 82 into contact with the springs 62, 64. The contacting of the springs 62, 64 by the battery rail faces 100, 102 occurs prior to the latch locking in the catch of the top wall 42. Accordingly, the springs 62, 64 compress into the bores 58, 60.

To release the battery pack 30 from the power tool 10, the button 76 is moved downwardly. As this occurs, the latch 78 also moves downwardly removing the latch from the catch 79 on the top wall 42. As this occurs, the battery pack 30 is no longer locked in position on the power tool housing receiving frame 32. At that time, the springs 62, 64, which are designed to have enough force to overcome the weight of the battery pack 30 and the terminal friction, eject the battery pack 30 away from the electrical connector housing 52. The battery pack 30 is ejected partially from the battery pack receiving frame 32. Also, the ejection disconnects the battery pack from the terminals.

While the above detailed description describes the preferred embodiment of the present invention, the invention is susceptible to modification, variation and alteration without deviating from the scope and fair meaning of the subjoined claims.

What is claimed is:

1. A power tool, comprising:
a housing having a cavity for receiving a battery pack;
a biasing member in the cavity, the biasing member for forcing the battery pack at least partially from the cavity;
a member for retaining the biasing member in the cavity, the member for retaining the biasing member having a guide for guiding the battery pack into contact with the biasing member such that when the battery pack is locked in the cavity the biasing member is in a compressed condition and when the battery pack is unlocked the biasing member forces the battery pack at least partially from the cavity.

2. A power tool, comprising:
a motor portion, a handle portion extending away from the motor portion and a base portion at a distal end of the handle portion away from the motor portion;
the base portion comprising a battery receiving cavity for receiving a battery pack;
a pair of biasing members located in the cavity at a forward end;
an electrical connector located between the biasing members; and wherein the cavity is configured to receive the battery pack such that the battery pack compresses the biasing members and engages the electrical connector.

\* \* \* \* \*